J. S. Truxel,
Mower.
No. 2743 Reissued Aug. 20 1867
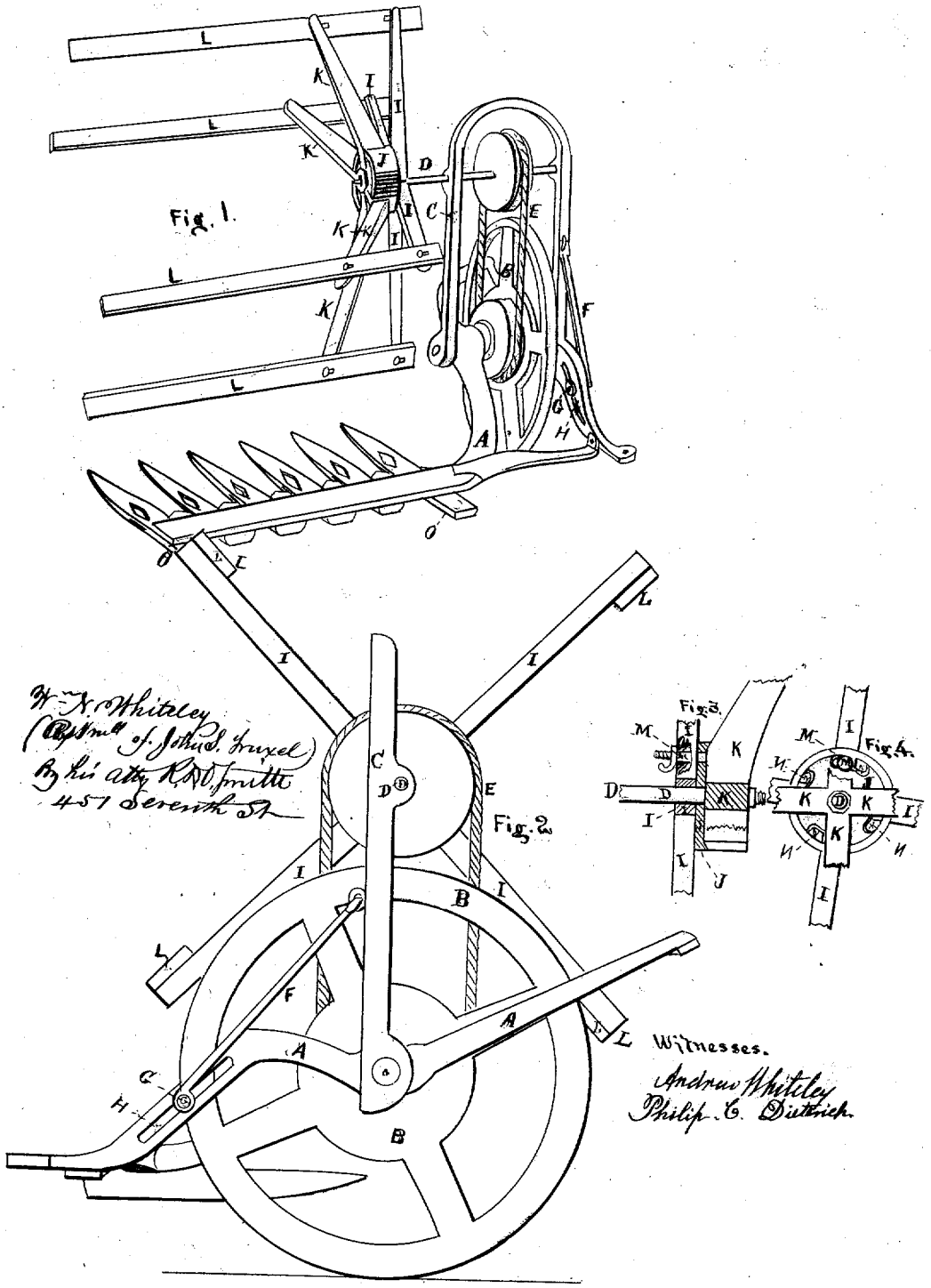

UNITED STATES PATENT OFFICE.

WILLIAM N. WHITELEY, OF SPRINGFIELD, OHIO, ASSIGNEE OF JOHN S. TROXEL.

IMPROVEMENT IN HARVESTER-REELS.

Specification forming part of Letters Patent No. 20,227, dated May 11, 1858; Reissue No. 2,743, dated August 20, 1867.

DIVISION B.

*To all whom it may concern:*

Be it known that JOHN S. TROXEL, of Mount Pleasant, in the county of Westmoreland and State of Pennsylvania, did invent a new and useful Improvement in Reels for Harvesters; and I do hereby declare the following to be a full, clear, and exact description of the same, reference being had to the accompanying drawings, in which—

Figure 1 is a perspective view of this invention. Fig. 2 is a side elevation of the same. Fig. 3 is a vertical cross-section through the reel-head. Fig. 4 is a side elevation of the reel-head.

That part of this invention included in this patent consists, first, in the harvester's reel constructed with a short shaft, so as to leave the center of the reel entirely open and unobstructed; second, in radiating all of the reel-arms from a single head situated at one end of the reel; third, in making a portion of the reel-arms adjustable laterally by rotating them upon the shaft, so as to make the reel-blades slightly oblique to the line of the cutters; fourth, in the manner of constructing the reel-head.

That others may understand the construction and operation of the devices which I employ in this invention, I will particularly describe them.

A is the main frame, to which the cutting apparatus is attached. This main frame is mounted upon the axle of the bearing and driving wheel B, which supports the machine as it is drawn forward, and gives motion to the cutters of the cutting apparatus. C is a vibrating frame or yoke, to the upper part of which the shaft D of the reel is secured by suitable boxes, in which said shaft may turn freely. The frame C is mounted upon pivots, which project from the main frame nearly or quite coincident with the axis of the shaft or axle, from which motion is directly transmitted to the reel-shaft D. The pivoting of this frame in the manner set forth enables me to move the reel-shaft forward or backward in the arc of a circle whose center is the axis of the reel's driving-shaft, and therefore without changing the distance between the centers of the said shafts, and the tension of the driving-belt E will not be varied by such movement of the shaft D and frame C. This variation of the position of the shaft D and the reel mounted thereon is frequently advantageous; but it is inconvenient and troublesome to change the length of the belt with every such change of position, and hence the importance of the frame or yoke, which will permit such change practically without variation in the tension of the driving-belt.

In order to retain the frame or yoke C in the desired position, I use a sliding or adjustable brace, F, jointed to said frame at a distance from the center, upon which the frame or yoke moves, and provided at its other end with a clamping-bolt, G, which passes through the slot H in a convenient part of the main frame. As the frame or yoke is moved forward or backward, the bolt G is correspondingly drawn to one or the other end of the slot H; and if the nut on the end of the clamping-bolt is tightened up, the brace F is rendered immovable, and the frame C is retained firmly in its then position. The reel belongs to the class known as "overhung open-head" reels—first, because they receive their support entirely at one end, and, second, because the shaft does not extend through the reel, but terminates in a head at one end thereof, from which the reel-arms project radially.

The advantages of this construction are lightness and reduction in point of size, because the weight of the central shaft and its outer end supports are dispensed with, and the absence of a central shaft, which must at all times be elevated higher than the tops of the standing grain; and if there is no central shaft, then the diameter may be reduced until, as it revolves, the upper blades of the reel will only fairly clear the tops of the standing grain.

The arms I I I I are permanently and rigidly attached to the shaft D by any efficient and convenient means. The metallic head J is placed upon the shaft D adjoining the arms I, but nearer the end of said shaft. The arms K K K K project from the head J in an oblique direction to the shaft D, and they are all retained thereon by a screw-nut on the end of said shaft. The head J is made adjustable by a slight rotary movement upon its axis, and the bolt M, with a nut at its outer end, passes through a curved slot, N, in the head J, and through one of the arms I, for the purpose of clamping said movable head to the permanent arm, and thus retaining the head J and arms K in the desired position in relation to the arms I. This adjustability of the arms K is for the purpose of giving a slight obliquity of the reel-blades L to the line of the cutter's reciprocation, or of arranging them parallel thereto, as may be desired. The reel-blades L are secured at their inner ends to the permanent arms I, and are secured at a little distance therefrom to the movable arms K by a screw or bolt passing through a slot in said blade and into the arm; and it is evident that if the arms K are rotated slightly on the shaft D, their outer ends will be moved sidewise, and the blades L will become oblique, as above described, because one end only of said blades can be thus moved. O O are lugs or plates, extending backward in rear of the finger-bar, for the purpose of forming points of attachment for the harvester's platform.

Having described this invention, what I claim as new, and desire to secure by Letters Patent, is—

1. Supporting the blades of overhanging reels from the head or plate on the end of the short shaft at the inner end of the reel by means of the straight arms I and oblique arms K, substantially as set forth.

2. The head or plate J, or equivalent, for the purpose of connecting the arms K K, which support the blade, to the short shaft at the inner end of the reel, substantially as and for the purpose set forth.

3. The adjustable head or plate J, substantially as and for the purpose specified.

4. The head J, constructed with the slots N, in combination with the clamping-bolt M and permanent arm I, substantially for the purpose set forth.

WM. N. WHITELEY.

Witnesses:
EDM. F. BROWN,
R. D. O. SMITH.